(12) United States Patent
Miyagoshi et al.

(10) Patent No.: US 9,949,187 B2
(45) Date of Patent: Apr. 17, 2018

(54) MOBILE WIRELESS TERMINAL AND CONTROL METHOD

(71) Applicant: PANASONIC INTELLECTUAL PROPERTY MANAGEMENT CO., LTD., Osaka (JP)

(72) Inventors: Takeshi Miyagoshi, Kanagawa (JP); Kenji Ooi, Kanagawa (JP); Akihiro Suzuki, Kanagawa (JP); Masaki Sato, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/522,026

(22) PCT Filed: Jul. 6, 2016

(86) PCT No.: PCT/JP2016/003214
§ 371 (c)(1),
(2) Date: Apr. 26, 2017

(87) PCT Pub. No.: WO2017/037985
PCT Pub. Date: Mar. 9, 2017

(65) Prior Publication Data
US 2017/0332294 A1   Nov. 16, 2017

(30) Foreign Application Priority Data

Aug. 28, 2015 (JP) .................................. 2015-169319

(51) Int. Cl.
*H04W 36/08* (2009.01)
*H04W 36/36* (2009.01)
(Continued)

(52) U.S. Cl.
CPC .......... *H04W 36/08* (2013.01); *H04W 36/22* (2013.01); *H04W 36/30* (2013.01); *H04W 36/36* (2013.01)

(58) Field of Classification Search
CPC ..... H04W 36/08; H04W 36/22; H04W 36/30; H04W 36/36; H04W 25/0222;
(Continued)

(56) References Cited

U.S. PATENT DOCUMENTS 6,205,128 B1 * 3/2001 Le ..................... H04W 36/0066
370/331
6,665,273 B1 * 12/2003 Goguen .................. H04L 45/00
370/252

(Continued)

FOREIGN PATENT DOCUMENTS

| JP | 2002-528976 | 9/2002 |
| JP | 2006-502658 | 1/2006 |

(Continued)

OTHER PUBLICATIONS

International Search Report, dated Sep. 27, 2016 by the Japan Patent Office (JPO) in the corresponding International Patent Application No. PCT/JP2016/003214.

*Primary Examiner* — Mehmood B. Khan
(74) *Attorney, Agent, or Firm* — Greenblum & Bernstein, P.L.C.

(57) ABSTRACT

A mobile wireless terminal is provided that controls a timing or a position in which handover is conducted between a plurality of access points, the terminal includes an antenna that receives a radio wave from an access point, a wireless communication interface that measures the radio wave, a processor, and a memory. The processor stores first and second received powers from respective first and second access points in the memory, conducts handover where a difference acquired by subtracting the first received power (Continued)

from the second received power is equal to or greater than a predetermined threshold, estimates a first available bandwidth before the handover and stores it in the memory, estimates a second available bandwidth after the handover and stores it in the memory, and controls a timing when handover of the mobile wireless terminal is conducted based on an available bandwidth difference between the first and second available bandwidths.

12 Claims, 18 Drawing Sheets

(51) Int. Cl.
*H04W 36/22* (2009.01)
*H04W 36/30* (2009.01)

(58) Field of Classification Search
CPC ...... H04L 47/72–47/767; H04L 67/148; H04L 5/0058; H04L 2012/5632
See application file for complete search history.

(56) References Cited

U.S. PATENT DOCUMENTS

| | | | |
|---|---|---|---|
| 6,704,571 B1 * | 3/2004 | Moon | H04L 1/187 370/331 |
| 7,089,009 B1 | 8/2006 | Fauconnier | |
| 8,619,708 B2 * | 12/2013 | Kallin | H04W 36/22 370/331 |
| 9,119,105 B1 * | 8/2015 | Vivanco | H04W 28/10 |
| 2004/0067754 A1 | 4/2004 | Gao et al. | |
| 2004/0170122 A1 * | 9/2004 | Guo | H04W 36/30 370/210 |
| 2004/0170191 A1 * | 9/2004 | Guo | H04W 36/0088 370/468 |
| 2005/0136928 A1 | 6/2005 | Zaki | |
| 2007/0232302 A1 * | 10/2007 | Aminov | H04W 36/36 455/433 |
| 2007/0280273 A1 * | 12/2007 | Yun | H04W 80/06 370/401 |
| 2008/0096561 A1 * | 4/2008 | Liu | H04W 36/08 455/436 |
| 2010/0226390 A1 * | 9/2010 | Yan | H04L 12/2801 370/468 |
| 2011/0013590 A1 * | 1/2011 | Chi | H04W 36/14 370/331 |
| 2011/0026494 A1 * | 2/2011 | Nagasawa | H04W 36/02 370/332 |
| 2011/0149911 A1 * | 6/2011 | Zhang | H04W 36/0061 370/331 |
| 2011/0306347 A1 * | 12/2011 | Choi | H04W 36/04 455/438 |
| 2014/0051449 A1 * | 2/2014 | Yerrabommanahalli | H04W 36/30 455/437 |
| 2014/0098670 A1 * | 4/2014 | Choi | H04L 5/00 370/235 |
| 2016/0057689 A1 | 2/2016 | Fujishiro et al. | |

FOREIGN PATENT DOCUMENTS

| | | |
|---|---|---|
| JP | 2007-518299 | 7/2007 |
| JP | 2010-239565 | 10/2010 |
| JP | 2011-087310 | 4/2011 |
| WO | 2004/034622 | 4/2004 |
| WO | 2005/065125 | 7/2005 |
| WO | 2014/163138 | 10/2014 |

* cited by examiner

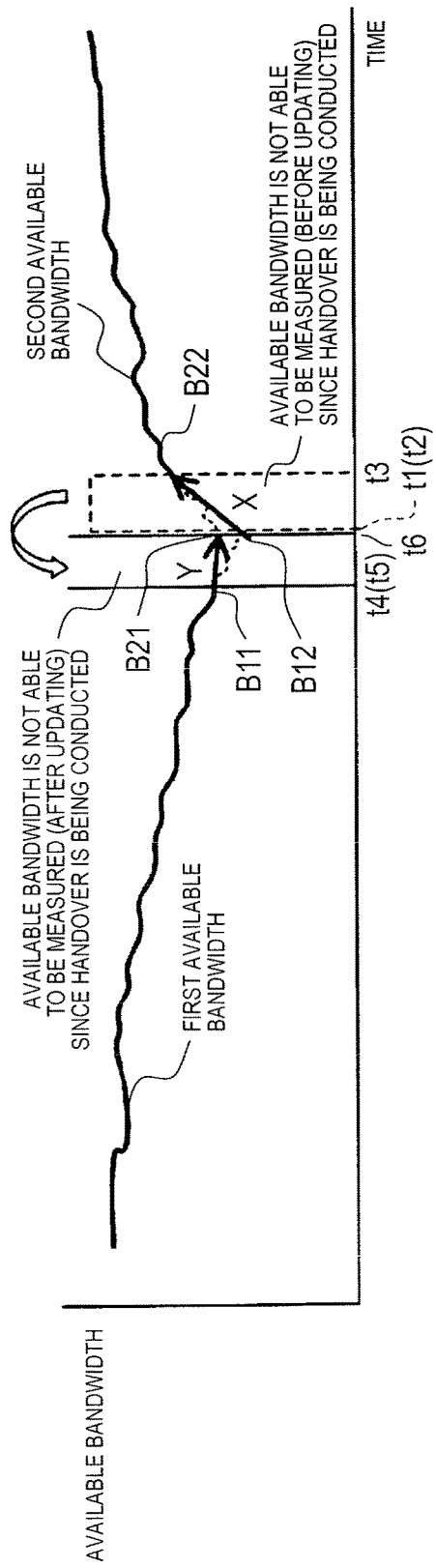

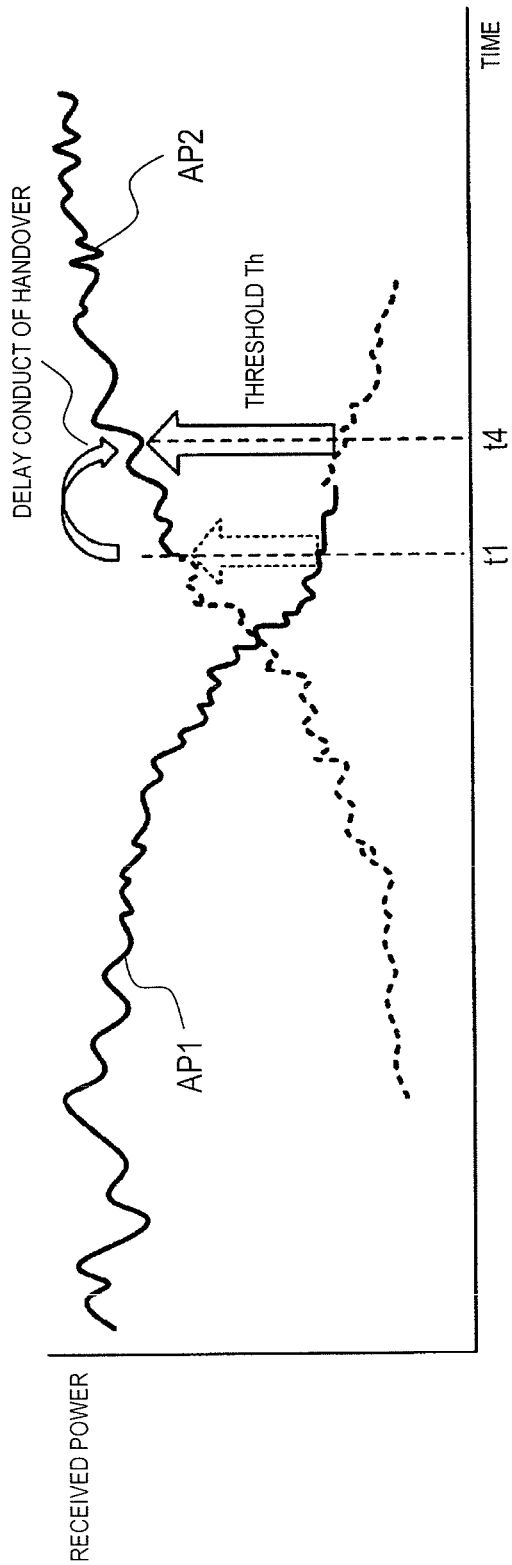

MOBILE WIRELESS TERMINAL AND CONTROL METHOD

TECHNICAL FIELD

The present disclosure relates to a mobile wireless terminal that controls a conduct timing and a position of handover, and a control method.

BACKGROUND ART

A mobile wireless terminal such as a smart phone or a tablet computer transmits and receives a radio wave to and from a radio base station provided by a communication operator, and performs wireless communication. When the mobile wireless terminal moves in an area where a plurality of radio base stations is installed, the mobile wireless terminal compares strength values of received powers (received radio waves) received from the respective radio base stations, and selects an optimum radio base station as a communication target. In general, a radio base station corresponding to the received radio wave having the highest strength is selected. An operation of switching the radio base station as the communication target from one radio base station to another radio base station is called handover.

Many documents related to the handover are presented. PTL 1 discloses a communication system in which a base station apparatus and a mobile station apparatus communicate with each other by a multiple access method of dividing a service area into a plurality of cells and allocating a radio channel to every communication and a base station apparatus used in the communication system. The base station apparatus includes cell determination means for determining a cell as a handover destination of the mobile station apparatus based on operation information including information indicating a movement direction of a moving object which moves in a predetermined route together with the mobile station apparatus in the predetermined route, positional information of the mobile station apparatus, and received strength of wireless communication between the mobile station apparatus and the base station apparatus.

In the disclosure of PTL 1, handover is conducted under a condition in which a moving object that moves on a railway of a tram arrives within a prescribed section within a prescribed route and the received power is equal to or less than a prescribed value.

As in the technology of PTL 1, a wireless communication system in which communication is performed in multiple modes by combining a plurality of modification schemes or a plurality of error correction coding schemes is suitable to realize high throughput and communication covering a wide area. In such a wireless communication system, since a physical transmission bandwidth is changed depending on the received power, it is reasonable to estimate and compare an upper limit throughput of a wireless communication area based on the strength of the received power from the radio base station.

CITATION LIST

Patent Literature

PTL 1: Japanese Patent Unexamined Publication No. 2010-239565

SUMMARY OF THE INVENTION

However, an index such as an available bandwidth directly related to performance of the wireless communication system or throughput depend on various causes. For example, as such causes, there are the number of mobile wireless terminals connected to the selected radio base station, the presence of noise, and a topology in a upstream network of another radio base station that connects the mobile wireless terminal and another apparatus (end system) communicating with the mobile wireless terminal. An upper limit of the throughput or the available bandwidth available in a communication service realized by the mobile wireless terminal is limited due to such causes. However, the mobile wireless terminal is difficult to determine such causes based on the received power from the radio base station.

In general, in a current handover technology, a position in which the handover is conducted is set to be a position in which received powers of two radio base stations are equal to each other. However, due to the above-described causes, the position in which the received powers from two radio base stations are equal to each other is not necessarily an appropriate position in which the handover is to be conducted.

The present disclosure relates to a mobile wireless terminal that controls a timing or a position in which handover is conducted in order to conduct appropriate handover between a plurality of radio base stations (access points).

The present disclosure is a mobile wireless terminal including: an antenna that is capable of receiving a radio wave from an access point; a wireless communication interface that measures a received power of the radio wave received by the antenna; a processor; and a memory. The processor in cooperation with the memory is configured to store a first received power from a first access point and a second received power from a second access point in the memory, conduct handover from the first access point to the second access point in a case where a difference acquired by subtracting the first received power from the second received power is equal to or greater than a predetermined threshold, estimate a first available bandwidth before the conduct of the handover, and store the estimated first available bandwidth in the memory, estimate a second available bandwidth after the conduct of the handover, and store the estimated second available bandwidth in the memory, and control a timing when handover of the mobile wireless terminal being moved is conducted based on an available bandwidth difference between the first available bandwidth and the second available bandwidth.

According to the present disclosure, the mobile wireless terminal can control a timing or a position in which handover is to be conducted depending on a situation, and can conduct appropriate handover.

BRIEF DESCRIPTION OF DRAWINGS

FIG. 4B is a graph showing a change of an available bandwidth.

FIG. 5A is a graph showing strength changes of received powers from two access points.

DESCRIPTION OF EMBODIMENTS

Figure 1:
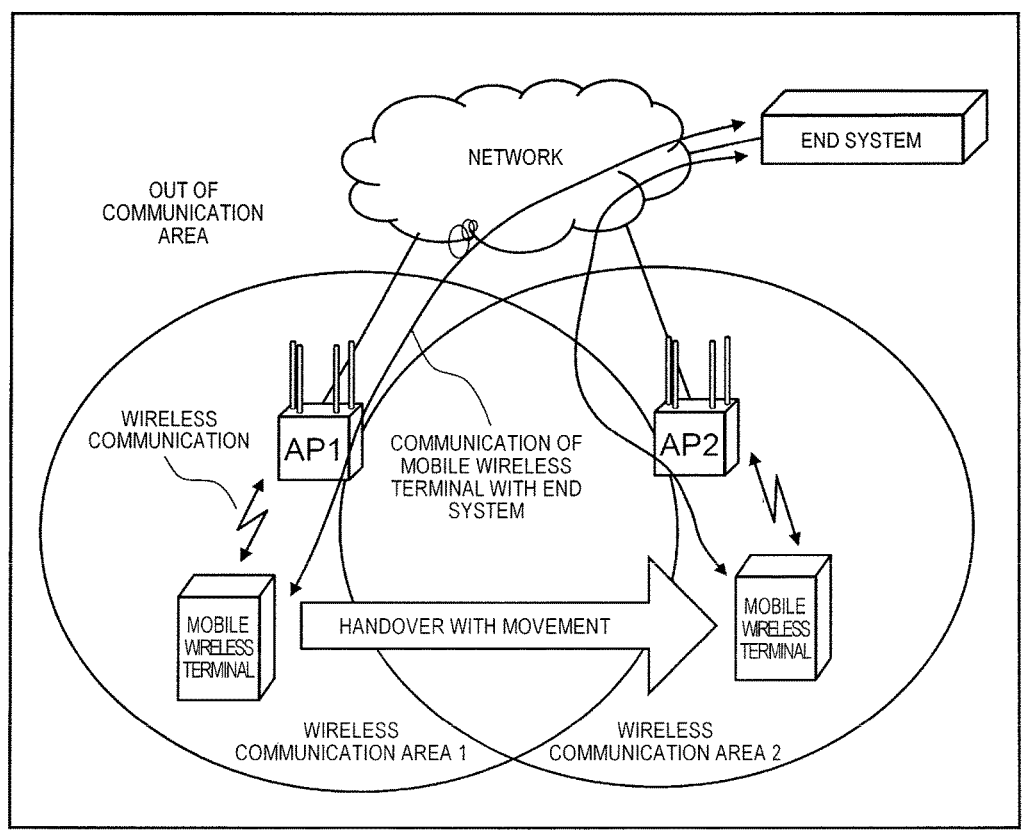
FIG. 1 is a conceptual diagram of a wireless communication system to which the present disclosure is applied.

Hereinafter, an exemplary embodiment (hereinafter, referred to as "present exemplary embodiment") that specifically discloses a mobile wireless terminal according to the present disclosure will be described in detail by appropriately referring to the drawings. Here, unnecessarily detailed description may be omitted. For example, the detailed description of the already well-known matters or the redundant description of the substantially same configurations may be omitted. By doing this, the following description is prevented from being unnecessarily redundant, and thus, those skilled in the art can easily understood the present disclosure. The accompanying drawings and the following description are provided to allow those skilled in the art to sufficiently the present disclosure, and are not intended to limit the subject matters described in claims.

(Premise)

FIG. 1 is a conceptual diagram of a wireless communication system to which the present disclosure is applied. A mobile wireless terminal such as a smart phone, a tablet computer, or a personal computer moves in an area where first radio base station AP1 (hereinafter, referred to as first access point AP1) 1 and second radio base station AP2 (hereinafter, referred to as second access point AP2) which are provided by a communication operator are installed. The mobile wireless terminal may perform wireless communication with first access point AP1 in wireless communication area 1, and may perform wireless communication with second access point AP2 in wireless communication area 2. Although not shown, other third access point AP3, fourth access point AP4, . . . , and N-th access point APN are further provided in the corresponding area, but only first access point AP1 and second access point AP2 are used in the following description.

First access point AP1 and second access point AP2 are also connected to other apparatuses (end systems) such as servers or other mobile wireless terminals via various networks. Accordingly, the mobile wireless terminal may perform wireless communication with first access point AP1 and second access point AP2, and may communicate with other end systems via networks. For example, the mobile wireless terminal may use various applications provided by the end systems.

As the mobile wireless terminal moves from a position close to first access point AP1 to a position close to second access point AP2, a received power (received strength) of a radio wave from first access point AP1 is decreased, and a received power of a radio wave from second access point AP2 is increased. In this case, handover for switching an access point as a communication target from first access point AP1 to second access point AP2 is conducted.

Figure 2A:
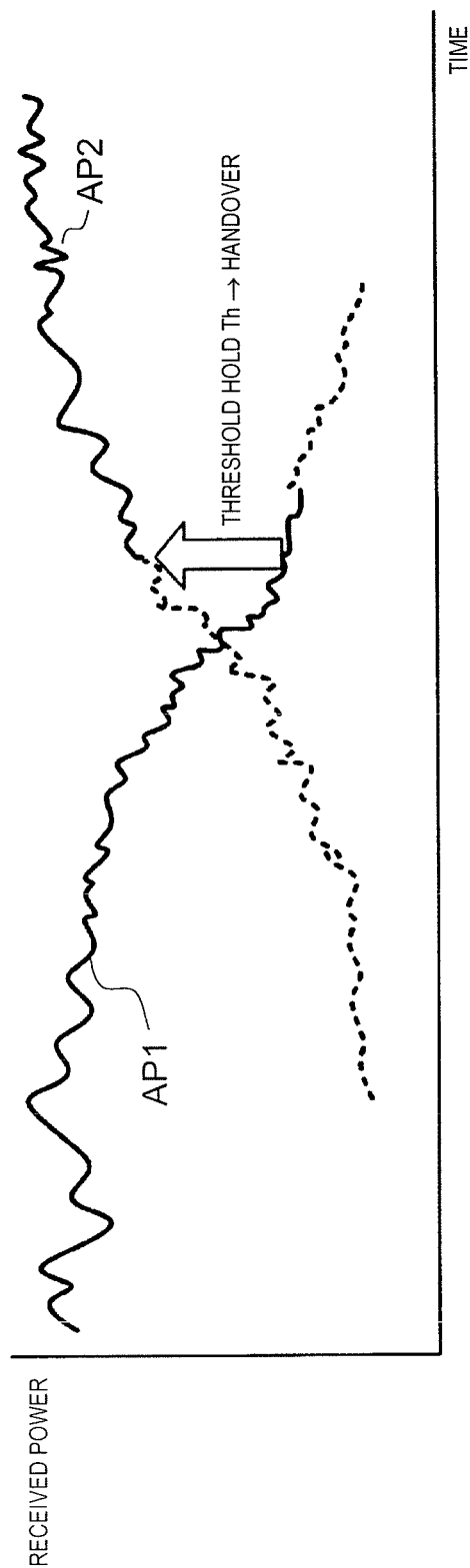
FIG. 2A is a graph showing strength changes of received powers from two access points.
Figure 2B:
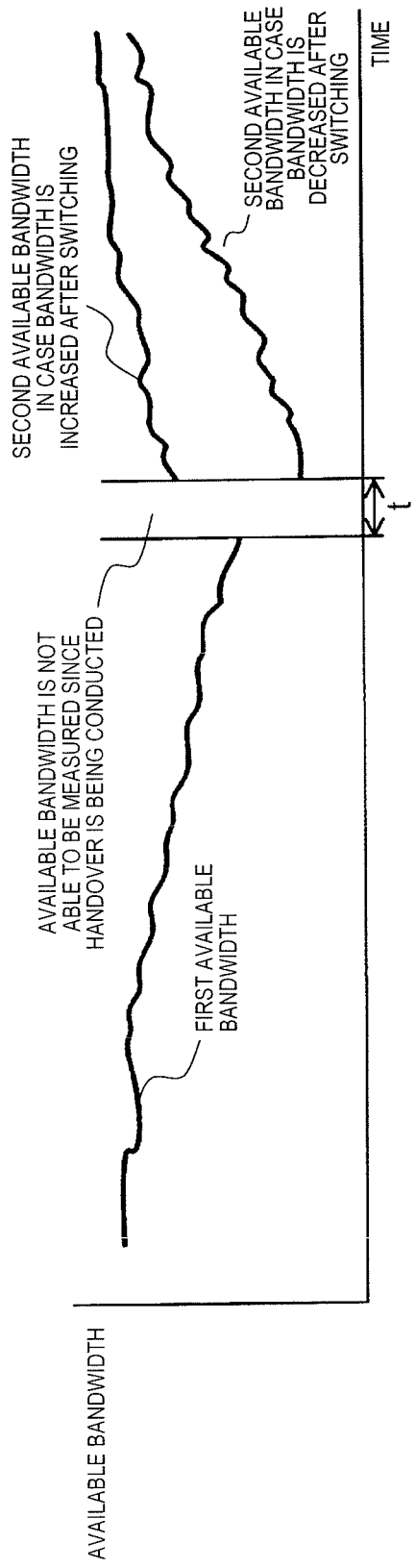
FIG. 2B is a graph showing a change of an available bandwidth.

FIGS. 2A and 2B are conceptual diagrams showing a conduct timing of the handover. In FIG. 1, the mobile wireless terminal initially performs wireless communication with closely located first access point AP1. However, with the movement of the mobile wireless terminal, the received power of the radio wave from first access point AP1 is decreased, and the received power of the radio wave from second access point AP2 is increased. The mobile wireless terminal conducts handover when the received power of the radio wave from first access point AP1 is less than the received power of the radio wave from second access point AP2.

Here, as depicted in a graph showing a strength change of the received power in FIG. 2A, actual handover is conducted by currently connected first access point AP1 when a received power of another second access point AP2 is increased to predetermined threshold Th or more. Received strength values of radio waves from two access points are easily varied due to fading (interference of a plurality of reflected waves) or other causes. In a case where there is no such a threshold, if the received power of second access point AP2 is greater than the received power of first access point AP1, the handover is conducted. In a case where an area near a boundary in which the handover is conducted is in a state in which the received strength is easily varied, unnecessary handover is frequently conducted, and thus, there is a concern that a hindrance to communication occurs. Thus, the handover is initially conducted when the received power of second access point AP2 is greater than the received power of first access point AP1 by predetermined threshold Th or more.

Incidentally, the strength of the received power (the strength of received radio wave) is one index for measuring capability of a communication path between mobile wireless terminal 100 and the access point. However, since the capability is varied depending on the number of mobile wireless terminals connected to the selected access point or a cause such as the presence of noise, an available bandwidth of the communication path may be used as an index for more accurately measuring the capability of the communication path. The available bandwidth is an available empty bandwidth acquired by subtracting other traffic flows in a network from a physical bandwidth of a bottleneck link of the communication path, and may actually reflect the amount of data capable of being transmitted and received in the communication path.

FIG. 2B is a graph showing a change of the available bandwidth. The available bandwidth may be estimated (calculated using a predetermined logic) by a delay time or a packet loss rate. It can be seen from this graph that a first available bandwidth of first access point AP1 before the conduct of the handover roughly follows a change of the received power of first access point AP1.

Since the mobile wireless terminal is not able to measure the received power at time t during the conduct of the handover, it is not possible to estimate the available bandwidth. A second available bandwidth of second access point AP2 after the conduct of the handover is varied by an environment of second access point AP2. A size of the second available bandwidth is varied depending on various causes such as the number of mobile wireless terminals connected to second access point AP2, noise, the presence of an object located near second access point AP2 even in the same place. Accordingly, after time t elapses, the second available bandwidth may be increased from the first available bandwidth immediately before the conduct, or may be decreased from the second available bandwidth. Such an increase or decrease of the second available bandwidth means that the handover is not conducted at an appropriate timing or position.

The mobile wireless terminal is difficult to previously ascertain a cause resulting in the increase or decrease of the second available bandwidth. A method of causing an available bandwidth of a specific area of a building to be previously stored in the mobile wireless terminal and causing the mobile wireless terminal to conduct the handover depending on the stored available bandwidth is considered. However, since the environment thereof is changed from day to day eve in the specific area within the building and the measurement of the available bandwidth also requires high cost, such a method is not practical.

Thus, the mobile wireless terminal of the present disclosure estimates the first available bandwidth before the conduct of the handover and the second available bandwidth after the conduct of the handover, and temporarily stores the estimated bandwidths. The mobile wireless terminal controls the timing or the position at which the handover is conducted based on an available bandwidth difference between the stored first available bandwidth and second available bandwidth. Hereinafter, a configuration and an operation of the mobile wireless terminal will be described.

(Configuration)

Figure 3:
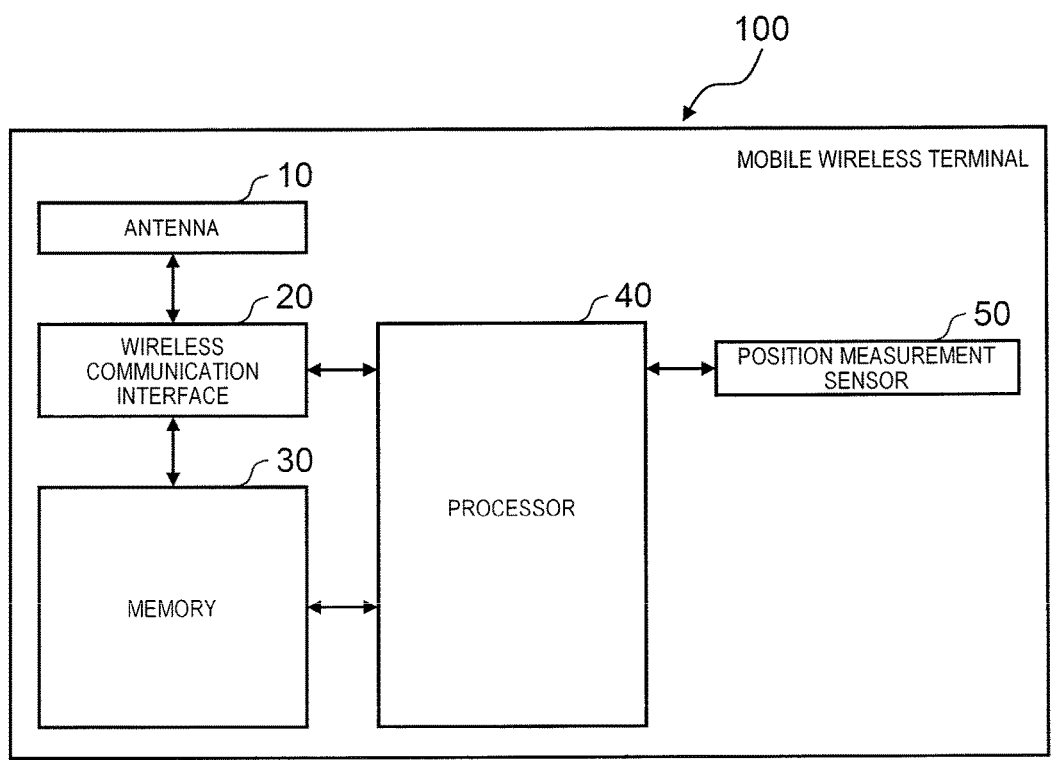
FIG. 3 is a block diagram showing a configuration of a mobile wireless terminal according to the present disclosure.

FIG. 3 is a block diagram showing the configuration of the mobile wireless terminal according to the exemplary embodiment of the present disclosure. Mobile wireless terminal 100 shown in FIG. 3 is, for example, a terminal, which is capable of performing wireless communication with access point AP and is capable of being carried by a user. A specific example of mobile wireless terminal 100 is a smart phone, a tablet computer, or a personal computer, and the type thereof is not particularly limited.

Mobile wireless terminal 100 includes antenna 10, wireless communication interface 20, memory 30, processor 40, and position measurement sensor 50. Antenna 10 is able to receive the radio wave from access point AP, and is able to transmit the radio wave to access point AP. The form of antenna 10 or the number of antennas is not particularly limited. Wireless communication interface 20 converts data generated by processor 40 to be described below or data retained in memory 30 into transmission data having a format capable of being transmitted by antenna 10, and delivers the converted data to antenna 10. Wireless communication interface 20 extracts reception data from the radio wave received by antenna 10 and delivers the extracted data to processor 40 or memory 30, but may measure the received power of the radio wave received by antenna 10. Wireless communication interface 20 is realized using various devices, and an aspect thereof is not particularly limited.

Processor 40 is constituted by various arithmetic operation devices, and controls mobile wireless terminal 100 based on a program retained in memory 30 or a not-shown storage device provided inside or outside mobile wireless terminal 100. The type of the arithmetic operation device constituting processor 40 is not particularly limited. Processor 40 processes data received from wireless communication interface 20, and runs various applications. Processor 40 performs various control tasks in cooperation with memory 30. Memory 30 is a storage device that retains a program required for controlling mobile wireless terminal 100, data from wireless communication interface 20, or various data items input to a not-shown operation input unit (key, switch, or touch panel) by the user, and an aspect thereof is not particularly limited. Position measurement sensor 50 is a device that measures a position of mobile wireless terminal 100 based on positional information acquired by a global positioning system (GPS), or a gyroscope and an acceleration sensor, and an aspect thereof is not particularly limited.

(Exemplary Embodiment 1)

Hereinafter, Exemplary Embodiment 1 will be described with reference to FIGS. 4A to 6. Initially, a state in which the wireless communication system shown in FIG. 1 is established in a predetermined area such as an office is assumed. Mobile wireless terminal 100 of the present exemplary embodiment receives the radio waves from first access point AP1 and second access point AP2, and measures the received power (received strength).

Initially, mobile wireless terminal 100 is located close to first access point AP1, and performs wireless communication with first access point AP1. In this case, the received power of second access point AP2 is considerably less than the received power of first access point AP1.

If mobile wireless terminal 100 moves toward second access point AP2 from first access point AP1, the received power of the radio wave from first access point AP1 is decreased, and the received power of the radio wave from second access point AP2 is increased.

In a case where received power received signal strength indication ($RSSI_2$: received signal strength) of second access point AP2 is greater than received power $RSSI_1$ of first access point AP1 by predetermined threshold Th or more ($RSSI_2 \leq RSSI_1 + Th$), processor 40 starts the conduct of the handover. Here, in a case where mobile wireless terminal 100 is initially used in the corresponding area or in a case where the mobile wireless terminal is used initially after mobile wireless terminal 100 is reset, processor 40 conducts (Th <−$Th_0$) handover by using, for example, initial value $Th_0$ of the threshold stored in memory 30 as an initial value of the threshold.

Specifically, processor 40 stores first received power from first access point AP1 and a second received power from second access point. AP2 in memory 30. In a case where a difference acquired by subtracting the first received power from the second received power is equal to or greater than a predetermined threshold (initial value $Th_0$ of threshold), processor 40 conducts the handover from first access point AP1 to second access point AP2.

Processor 40 sequentially estimates the available bandwidth. Processor 40 estimates the first available bandwidth before the conduct of the handover and stores the estimated bandwidth in memory 30, and estimates the second available bandwidth after the conduct of the handover and stores the estimated bandwidth in memory 30. As the estimation of the available bandwidth, an existing calculation method is used. As an example of the existing calculation method, TCP Friendly Rate Control (TFRC) or binomial congestion control (BCC) may be used.

Here, processor 40 controls a timing when the handover of mobile wireless terminal 100 being moved is conducted based on the available bandwidth difference which is a difference between the estimated first available bandwidth and second available bandwidth. That is, whenever the handover is conducted, processor 40 refers to an existing threshold Th in this case and the previous and current available bandwidths, and updates the existing threshold based on these referred values. A specific updating method will be described with reference to FIGS. 4A to 5B.

Figure 4A:
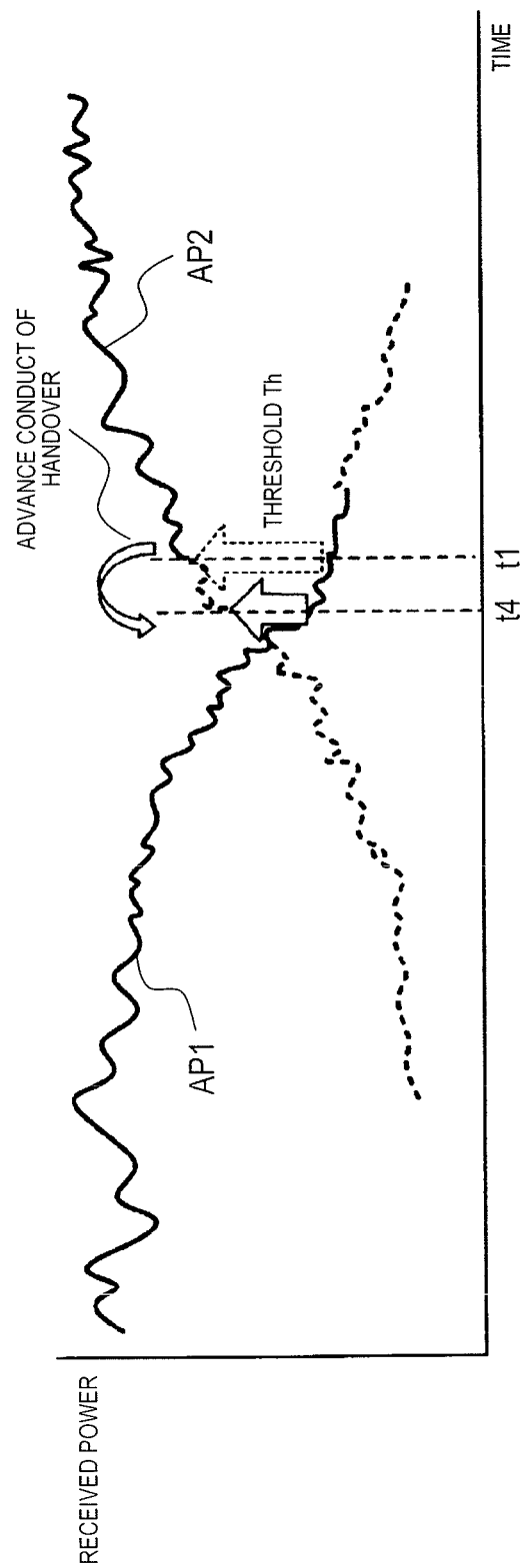
FIG. 4A is a graph showing strength changes of received powers from two access points.

FIGS. 4A and 4B show a method of updating threshold Th, which is performed by processor 40 in a case where the available bandwidth is increased after the conduct of the handover. As shown in FIG. 4A, wireless communication interface 20 measures the received powers of the received radio waves of first access point AP1 and second access point AP2 received by antenna 10, processor 40 calculates a difference between the received powers of the received radio waves of two access points, and compares this difference with predetermined threshold Th determined in advance. In FIG. 4A, since this difference is equal to the predetermined threshold Th determined in advance at time t1, processor 40 conducts the handover.

In this case, second available bandwidth B22 (time t3) after the conduct of the handover is increased from first available bandwidth B12 (time t2) before the conduct of the handover, as shown in FIG. 4B. If the difference between the received powers of the received radio waves of two access points reaches predetermined threshold Th, processor 40 starts the conduct of the handover at time t1, and ends the conduct of the handover after a predetermined time elapses (time t3). Processor 40 stores in the available bandwidths at times t1 to t3 in memory 30.

This phenomenon means that mobile wireless terminal 100 excessively maintains wireless communication with first access point AP1 more than needs for a period of time which exceeds a timing when the handover is originally to be conducted. First available bandwidth B12 before the conduct of the handover is excessively small, and second available bandwidth B22 after the conduct of the handover is excessively large. As a result, since a difference between second available bandwidth B22 and first available bandwidth B12 becomes large, whereas an absolute value of first available bandwidth B12 becomes small as depicted by arrow X, there is a concern that smooth communication is obstructed.

Thus, processor 40 controls such that the timing when the handover is conducted is advanced in the conduct of next handover in an environment in which the same received power and available bandwidth as the previous received power and available bandwidth are acquired. Specifically, processor 40 conducts the handover at time t4 earlier than time t1 which is a previous timing, as shown in FIG. 4A.

Specifically, processor 40 calculates new threshold Th smaller than threshold Th used in the previous handover, and conducts the handover based on new threshold Th. In the calculation of new threshold Th, processor 40 uses, for example, the following expression (1) or (2). Here, the method of calculating new threshold Th is not limited to the method using these expressions.

$$Th \leftarrow Th - d (d \text{ is a positive constant}) \quad (1)$$

$$Th \leftarrow Th \times \alpha (0 < \alpha < 1: \alpha \text{ is a constant}) \quad (2)$$

That is, in a case where the second available bandwidth is greater than the first available bandwidth, processor 40 decreases predetermined threshold Th. In this case, the handover is conducted for a period of time from time t4 (t5) to t6, as shown in FIG. 4B. As a result, since a difference between second available bandwidth B21 (time t6) after the conduct of the handover and first available bandwidth B11 (time t5) before the conduct of the handover is smaller than a difference (arrow X) between second available bandwidth B22 and first available bandwidth B12 in the previous handover, as depicted by arrow Y and an absolute value of first available bandwidth B11 is a sufficient value, smooth communication may be performed before and after the handover. Accordingly, it is possible to increase a possibility that smooth handover will be conducted by updating threshold Th.

Figure 5B:
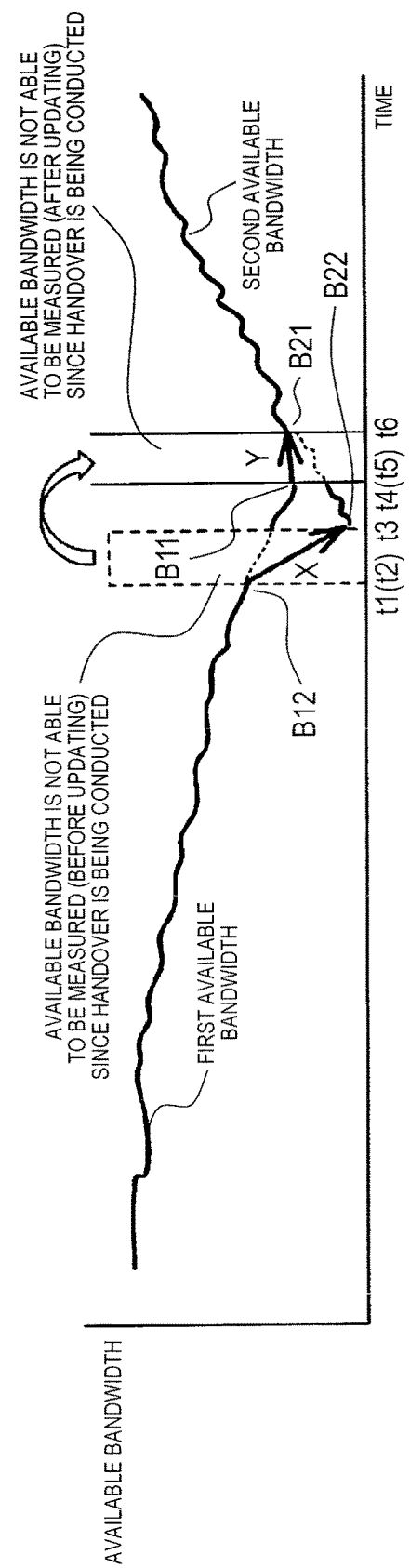
FIG. 5B is a graph showing a change of an available bandwidth.

FIGS. 5A and 5B show a method of updating threshold Th which is performed by processor 40 in a case where the available bandwidth is decreased after the conduct of the handover. As shown in FIG. 5A, wireless communication interface 20 calculates the received powers of the received radio waves of first access point AP1 and second access point AP2 received by antenna 10, processor 40 calculates a difference between the received powers of the received radio waves of two access points, and compares this difference with predetermined threshold Th determined in advance. In FIG. 5A, since this difference is equal to the predetermined threshold Th determined in advance at time t1, processor 40 conducts the handover.

In this case, second available bandwidth B22 (time t3) after the conduct of the handover is decreased from first available bandwidth B12 (time t2) before the conduct of the handover, as shown in FIG. 5B. Processor 40 starts the conduct of the handover at a timing (time t2) before the difference between the received powers of the received radio waves of two access points reaches predetermined threshold Th, and ends the conduct of the handover after a predetermined time elapses (time t3). The handover is regarded as being conducted at time t1 during a time (t3−t2) required in the handover. Processor 40 stores in the available bandwidths at times t1 to t3 in memory 30.

This phenomenon means that mobile wireless terminal 100 ends wireless communication with first access point AP1 earlier than a timing when the handover is to be originally conducted. First available bandwidth B12 before the conduct of the handover is maintained as being large to a certain degree, and second available bandwidth B22 after the conduct of the handover is still small. As a result, since a difference between second available bandwidth B22 and first available bandwidth B12 becomes large, whereas an absolute value of second available bandwidth B22 becomes small as depicted by arrow X, there is a concern that smooth communication is obstructed.

Thus, processor 40 controls such that the timing when the handover is conducted is delayed the conduct of next handover in an environment in which the same received power and available bandwidth as the previous received power and available bandwidth are acquired. Specifically, processor 40 conducts the handover at time t4 later than time t1 which is the previous timing, as shown in FIG. 5A.

Specifically, processor 40 calculates new threshold Th larger than threshold Th used in the previous handover, and conducts the handover based on new threshold Th. In the calculation new threshold Th, processor 40 uses, for example, the following expression (3) or (4). Here, the method of calculating new threshold Th is not limited to the method using these expressions.

$$Th \leftarrow Th + d\ (d \text{ is a positive constant}) \tag{3}$$

$$Th \leftarrow Th \times \beta\ (1 < \beta; \beta \text{ is a constant}) \tag{4}$$

That is, in a case where second available bandwidth is greater than first available bandwidth, processor 40 increases predetermined threshold Th. In this case, the handover is conducted for a period of time from time t4 (t5) to t6, as shown in FIG. 5B. As a result, since a difference between second available bandwidth B21 (time t6) after the conduct of the handover and first available bandwidth B11 (time t5) before the conduct of the handover is smaller than a difference (arrow X) between second available bandwidth B22 and first available bandwidth B12 of the previous handover, as depicted by arrow Y and an absolute value of second available bandwidth B21 is a sufficient value, smooth communication may be conducted before and after the handover. Accordingly, it is possible to increase a possibility that smooth handover will be conducted by updating threshold Th.

Figure 6:
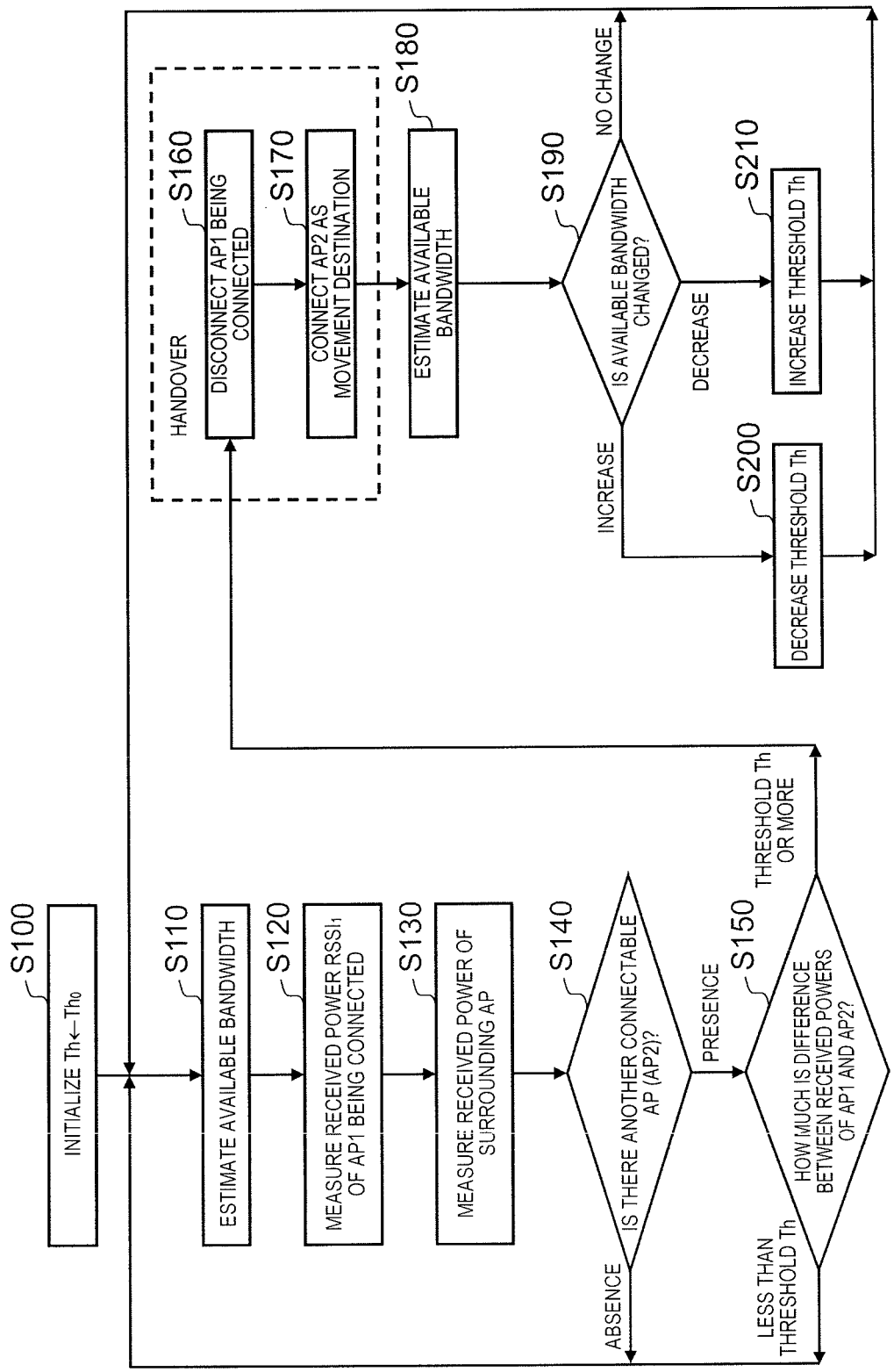
FIG. 6 is a flowchart showing a procedure of controlling conduct of handover conducted by a mobile wireless terminal of Exemplary Embodiment 1.

FIG. 6 is a flowchart showing a procedure of controlling the conduct of the handover conducted by mobile wireless terminal 100 of the present exemplary embodiment shown in FIGS. 4A to 5B. Initially, processor 40 of mobile wireless terminal 100 sets threshold Th retained in memory 30 to be initial value $Th_0$ through initialization (step S100). Processor 40 estimates the available bandwidth (step S110).

Wireless communication interface 20 measures received power $RSSI_1$ of the received power of the received radio wave of first access point AP1 which is access point AP to which antenna 10 is being connected (step S120). Wireless communication interface 20 measures the received power of the received radio wave of surrounding access point AP received by antenna 10 (step S130). Here, processor 40 determines whether or not there is another connectable access point AP based on the measurement result of wireless communication interface 20 (step S140). In a case where there is no another connectable access point AP, processor 40 enters a mode in which operations subsequent to step S110 are repeated again.

In a case where there is another connectable access point AP, wireless communication interface 20 regards another access point AP as second access point AP2. For example, in a case where there is a plurality of other connectable access points AP, it is possible to regard access point AP having the highest received power of the received radio wave, as second access point AP2. Processor 40 determines whether the difference between the received powers of first access point AP1 and second access point AP2 is equal to or greater than threshold Th (initial threshold $Th_0$ in an initial case) or is less than threshold Th (step S150).

In a case where the difference between the received powers is less than threshold Th, processor 40 enters a mode in which operations subsequent to step S110 are repeated again. In a case where the difference between received powers is equal to or greater than threshold Th, processor 40 conducts the handover. That is, processor 40 disconnects wireless communication with currently connected first access point AP1 (step S160), and performs connection using wireless communication with second access point AP2 as a movement destination (step S170).

Subsequently, processor 40 estimates the available bandwidth (step S180), and performs a process corresponding to a value of the estimated available bandwidth (step S190). That is, in a case where the estimated available bandwidth is not changed from the previous value, processor 40 enters a mode in which operations subsequent to step S110 are repeated again. In a case where the estimated available bandwidth is increased from the previous value (a case of FIG. 4A and 4B), processor 40 decreases threshold Th (step S200). In a case where the estimated available bandwidth is decreased from the previous value (case of FIG. 5A and 5B), processor 40 decreases threshold Th (step S210). An increase amount and a decrease amount of threshold Th in step S200 and step S210 may be calculated by adding a weight to increase and decrease amounts of a plurality of past available bandwidths.

As described above, processor 40 controls a timing when the handover of mobile wireless terminal 100 being moved is conducted based on the available bandwidth difference which is a difference between first available bandwidth and second available bandwidth. As a result, processor 40 can appropriately control the timing when the handover is conducted, and it is possible to increase a possibility that smoother handover will be conducted.

(Exemplary Embodiment 2)

Figure 7A:
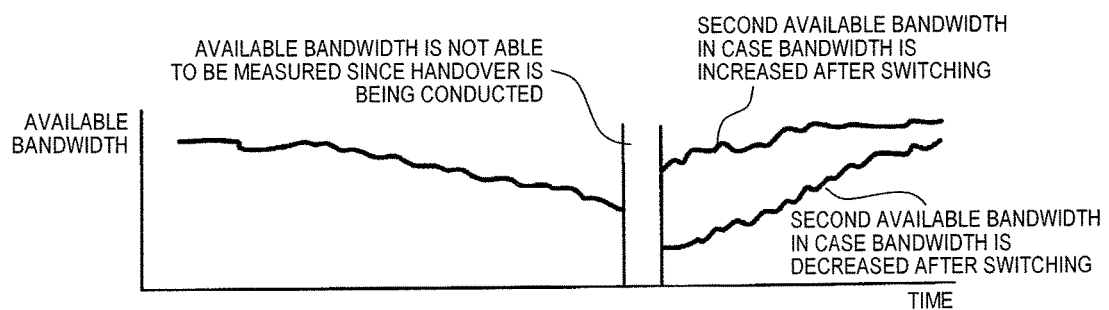
FIG. 7A is a graph showing a case where an available bandwidth is increased or decreased after the conduct of the handover similarly to the graph shown in FIGS. 4B and 5B.
Figure 7B:
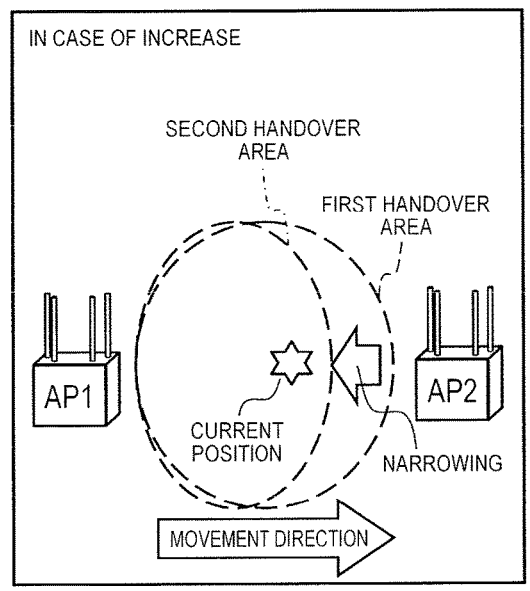
FIG. 7B is a conceptual diagram showing control for updating a handover area where the handover conducted by the mobile wireless terminal is conducted in a case where the available bandwidth is increased at the time of the conduct of the handover.
Figure 7C:
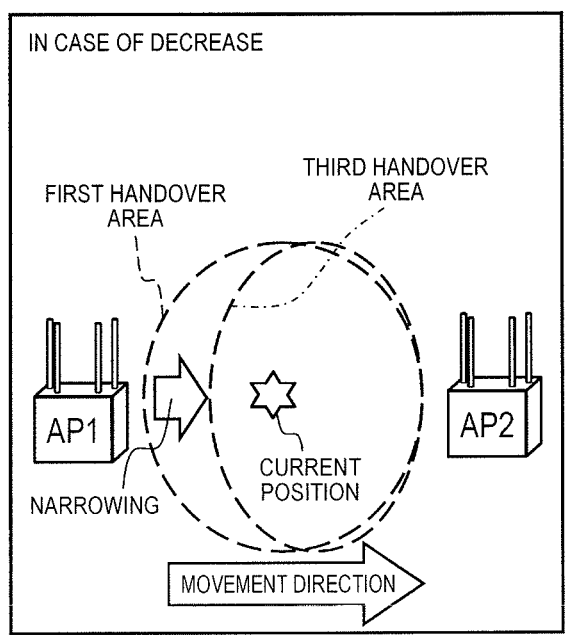
FIG. 7C is a conceptual diagram showing control for updating a handover area where the handover conducted by the mobile wireless terminal is conducted in a case where the available bandwidth is decreased at the time of the conduct of the handover.

FIGS. 7A to 7C are conceptual diagrams showing control of a conduct position of the handover conducted by mobile wireless terminal 100 of Exemplary Embodiment 2. Similarly to the graphs shown in FIGS. 4B and 5B, FIG. 7A is a graph showing a case where the available bandwidth is increased or decreased after the handover of mobile wireless terminal 100 that moves from first access point AP1 to second access point AP2 is conducted. Processor 40 of mobile wireless terminal 100 of Exemplary Embodiment 1 updates threshold Th depending on such an increase or decrease of the available bandwidth. In mobile wireless terminal 100 of the present exemplary embodiment, processor 40 updates the handover area which is an area where the handover is conducted using position measurement sensor 50 that is not particularly used in Exemplary Embodiment 1.

FIG. 7B shows control for updating the handover area where the handover conducted by mobile wireless terminal 100 is conducted in a case where the available bandwidth is increased at the time of the conduct of the handover as shown in FIG. 4B. Processor 40 stores a first position of mobile wireless terminal 100 at the time of conduct of first handover, which is measured by position measurement sensor 50, in memory 30. As shown in the diagram, processor 40 determines a first handover area and stores the determined area in memory 30 based on the first position. In an initial state, the first position and the first handover area may be previously stored as initial values in memory 30, or information items regarding the position and the handover area may not be stored.

In a case where the available bandwidth is increased (in a case where the second available bandwidth is greater than the first available bandwidth), processor 40 determines a second handover area by narrowing the first handover area toward first access point AP1. Processor 40 stores the second handover area in memory 30.

As a result of the above-described control, the second handover area after the updating is further narrowed toward first access point AP1 than the first handover area before the updating. A handover area matching an actual change of the available bandwidth is formed. Processor 40 may form the second handover area by moving the entire first handover area toward first access point AP1.

FIG. 7C shows control for updating the handover area where the handover conducted by mobile wireless terminal 100 is conducted in a case where the available bandwidth is decreased at the time of the conduct of the handover as shown in FIG. 5B. Processor 40 stores a first position of mobile wireless terminal 100 at the time of conduct of first handover, which is measured by position measurement sensor 50, in memory 30. As shown in the diagram, processor 40 determines a first handover area and stores the determined area in memory 30 based on the first position. In an initial state, the first position and the first handover area may be previously stored as initial values in memory 30, or information items regarding the position and the handover area may not be stored.

In a case where the available bandwidth is decreased (the second available bandwidth is smaller than the first available bandwidth), processor 40 determines a third handover area by narrowing the first handover area toward second access point AP2. Processor 40 stores in the third handover area in memory 30.

As the result of the above-described control, the third handover area after the updating is further narrowed toward second access point AP2 than the first handover area before the updating. A handover area matching an actual change of the available bandwidth is formed. Processor 40 may form the third handover area by moving the entire first handover area toward second access point AP2.

Figure 8:
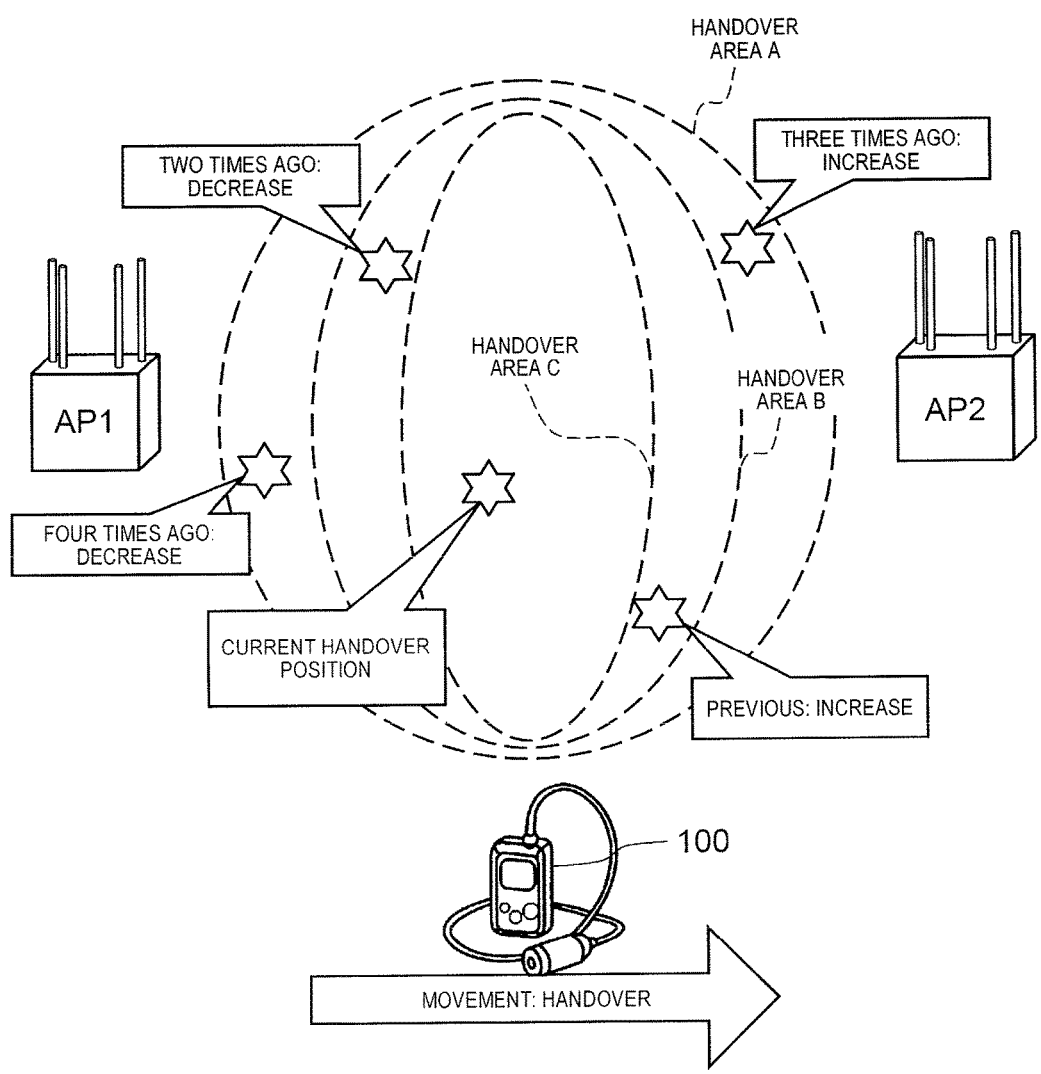
FIG. 8 is a conceptual diagram showing a state in which updating of the handover area shown in FIGS. 7B and 7C is repeated and an appropriate position in which the handover is to be conducted is narrowed.

FIG. 8 is a conceptual diagram showing a state in which the updating of the handover area shown in FIGS. 7B and 7C is repeated, the handover area is sequentially narrowed, and an appropriate position in which the handover is to be conducted is narrowed. The available bandwidth is decreased in the handover conducted four times ago, the available bandwidth is increased in the handover three times ago, the available bandwidth is decreased in the handover two times ago, and the available bandwidth is increased in the handover four times ago. As a result, the handover area becomes small while being narrowed in the sequence of Handover Area A->Handover Area B->Handover Area C. As a result, a handover area that more accurately matches the actual available bandwidth is formed.

Figure 9:
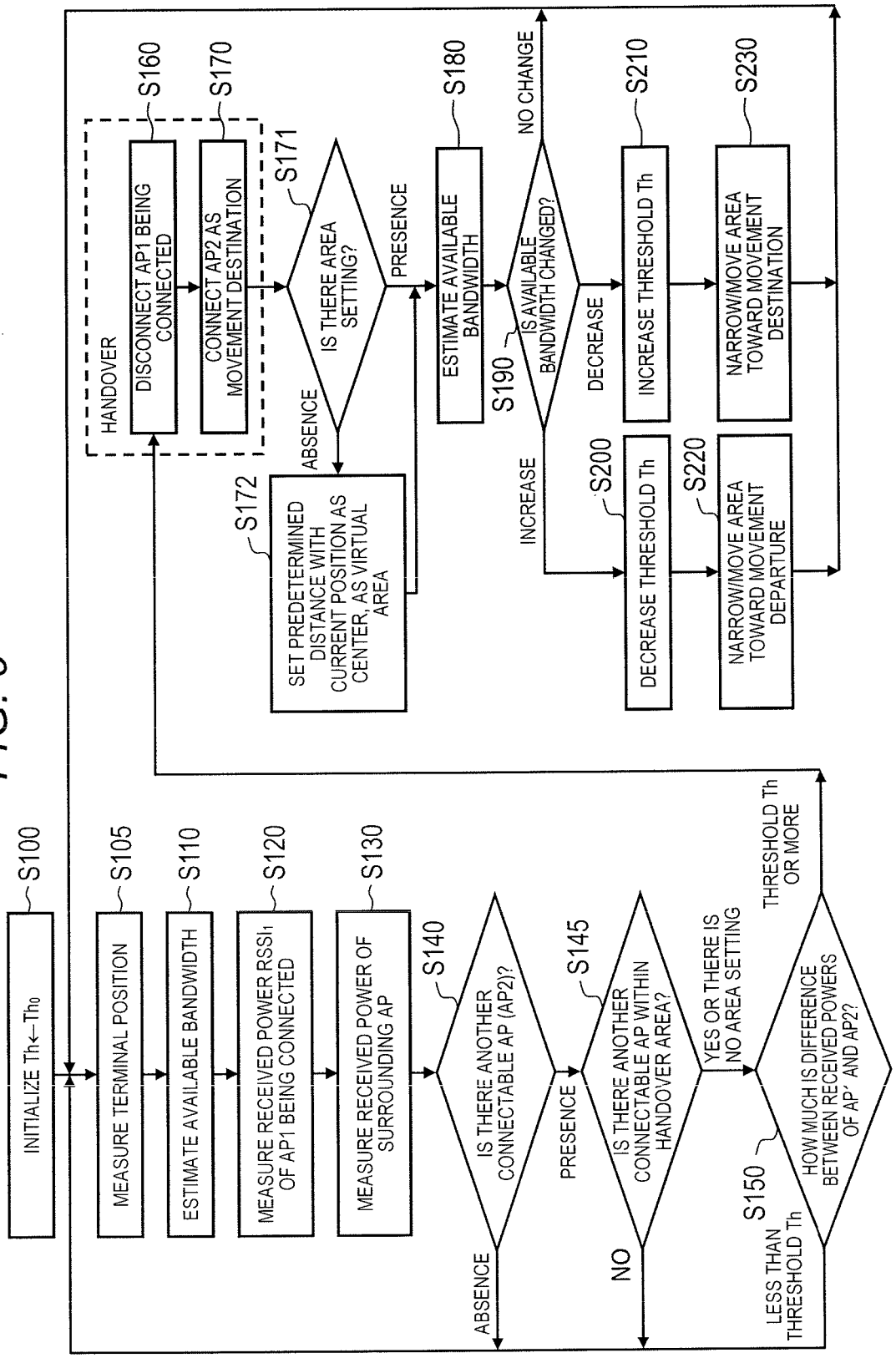
FIG. 9 is a flowchart showing a procedure of controlling the conduct of the handover conducted by a mobile wireless terminal of Exemplary Embodiment 2.

FIG. 9 is a flowchart showing a procedure of controlling the conduct of the handover conducted by mobile wireless terminal 100 of the present exemplary embodiment shown in FIGS. 7A to 8. Initially, processor 40 of mobile wireless terminal 100 sets threshold Th retained in memory 30 to be initial value $Th_0$ through initialization (step S100). In the present example, the information items regarding the position and the handover area may not be stored in memory 30.

Subsequently, position measurement sensor 50 measures the position of mobile wireless terminal 100 (step S105), and processor 40 estimates the available bandwidth (step S110).

Wireless communication interface 20 measures received power $RSSI_1$ of the received power of the received radio wave of first access point AP1 which is access point AP to which antenna 10 is being connected (step S120). Wireless communication interface 20 measures the received power of the received radio wave of surrounding access point AP received by antenna 10 (step S130). Here, processor 40 determines whether or not there is another connectable access point AP based on the measurement result of wireless communication interface 20 (step S140). In a case where there is no another connectable access point AP, processor 40 enters a mode in which operations subsequent to step S105 are repeated again.

In a case where there is another connectable access point AP, wireless communication interface 20 regards another access point AP as second access point AP2. For example, in a case where there is a plurality of other connectable access points AP, it is possible to regard access point AP having the highest received power of the received radio wave, as second access point AP2.

Subsequently, processor 40 determines whether or not mobile wireless terminal 100 is located within a predetermined handover area based on information of the position measured by position measurement sensor 50 (step S145). In a case where the terminal is not located within the predetermined handover area, processor 40 enters a mode in which operations subsequent to step S105 are repeated again. In a case where the terminal is located within the predetermined handover area or in a case where any handover area is not set, processor 40 determines whether the difference between the received powers of first access point AP1 and second access point AP2 is equal to or greater than threshold Th (initial threshold $Th_0$ in an initial case) or is less than threshold Th (step S150).

In a case where the difference between the received powers is less than threshold Th, processor 40 enters a mode in which operations subsequent to step S110 are repeated again. In a case where the difference between received powers is equal to or greater than threshold Th, processor 40 conducts the handover. That is, processor 40 disconnects wireless communication with currently connected first access point AP1 (step S160), and performs connection using wireless communication with second access point AP2 as a movement destination (step S170).

For example, processor 40 determines whether or not the handover area is previously set in memory 30 (step S171), and estimates the available bandwidth in a case where the handover area is set (step S180). In a case where the handover area is not set, the processor sets a range having a predetermined distance with the current position of mobile wireless terminal 100 as a center, as a virtual handover area (step S172), and estimates the available bandwidth (step S180).

Subsequently, processor 40 performs a process depending on a value of the estimated available bandwidth (step S190). That is, in a case where the estimated available bandwidth is not changed from the previous value, processor 40 enters a mode in which operations subsequent to step S110 are repeated again. In a case where the estimated available bandwidth is increased from the previous value (case of FIG. 4A and 4B), processor 40 decreases threshold Th (step S200), and narrows the handover area toward first access point AP1 which is the movement destination (step S220; case of FIG. 7A). Processor 40 may form the second handover area by moving the entire handover area toward first access point AP1. In a case where the estimated available bandwidth is decreased from the previous value (case of FIG. 5A and 5B), processor 40 increases threshold Th (step S210), and narrows the handover area toward second access point AP2 which is the movement destination (step S230; case of FIG. 7B). Processor 40 may form the third handover area by moving the entire handover area toward second access point AP2.

An increase amount and a decrease amount of threshold Th in step S200 and step S210 may be calculated by adding a weight to increase and decrease amounts of a plurality of past available bandwidths. A width (or movement width) with which the handover area in step S220 or step S230 is narrowed may also be calculated by adding a weight to increase and decrease amounts of a plurality of past available bandwidths.

As described above, processor 40 controls a handover area directly connected to a position in which the handover of mobile wireless terminal 100 being moved is conducted based on the available bandwidth difference which is a difference between first available bandwidth and second available bandwidth. As a result, processor 40 can control the position in which the handover is conducted to be a more appropriate position, and it is possible to increase a possibility that smoother handover will be conducted.

(Exemplary Embodiment 3)

FIGS. 10 to 13 are conceptual diagrams showing control of a conduct position of the handover conducted by mobile wireless terminal 100 of Exemplary Embodiment 3. For example, mobile wireless terminal 100 of the present exemplary embodiment extracts temporally and spatially close handover information items from past handover histories stored in memory 30. In specific access point AP, the number of terminals to be connected or a congestion degree is changed with time. Handover history information items closer to the current position and the current time are estimated to be close to a condition of the handover to be used henceforward.

Figure 10:
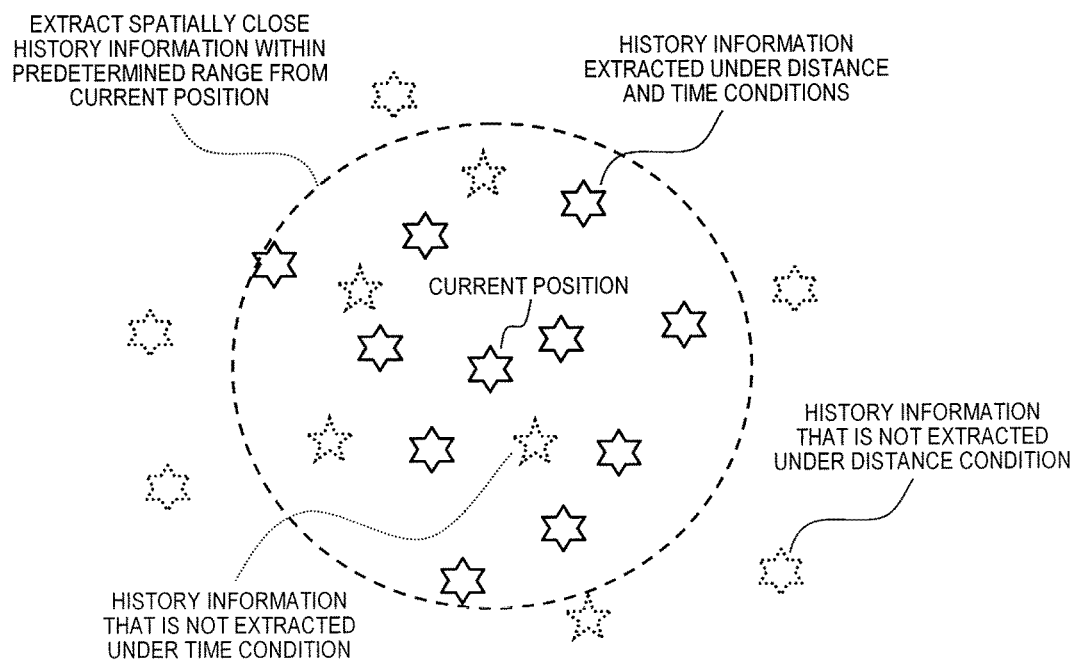
FIG. 10 is a conceptual diagram showing a state in which the mobile wireless terminal of Exemplary Embodiment 2 extracts only history information of predetermined handover.

As shown in FIG. 10, processor 40 of mobile wireless terminal 100 extracts only the handover history information items which are within a predetermined time from (are temporally close to) the current time. For example, processor 40 extracts the handover history information items within one hour from the current time from memory 30. Processor 40 extracts only the handover history information items which are within a predetermined range from (are spatially close to) the current position from the history information items in this manner. For example, processor 40 extracts handover history information items within 20 m from the current position. A method of initially extracting the spatially close history information items and extracting the temporally close history information items from the previously extracted history information items may be used. Ultimately, in the present example, only the history information items which satisfy both temporal and spatial conditions.

Figure 11:
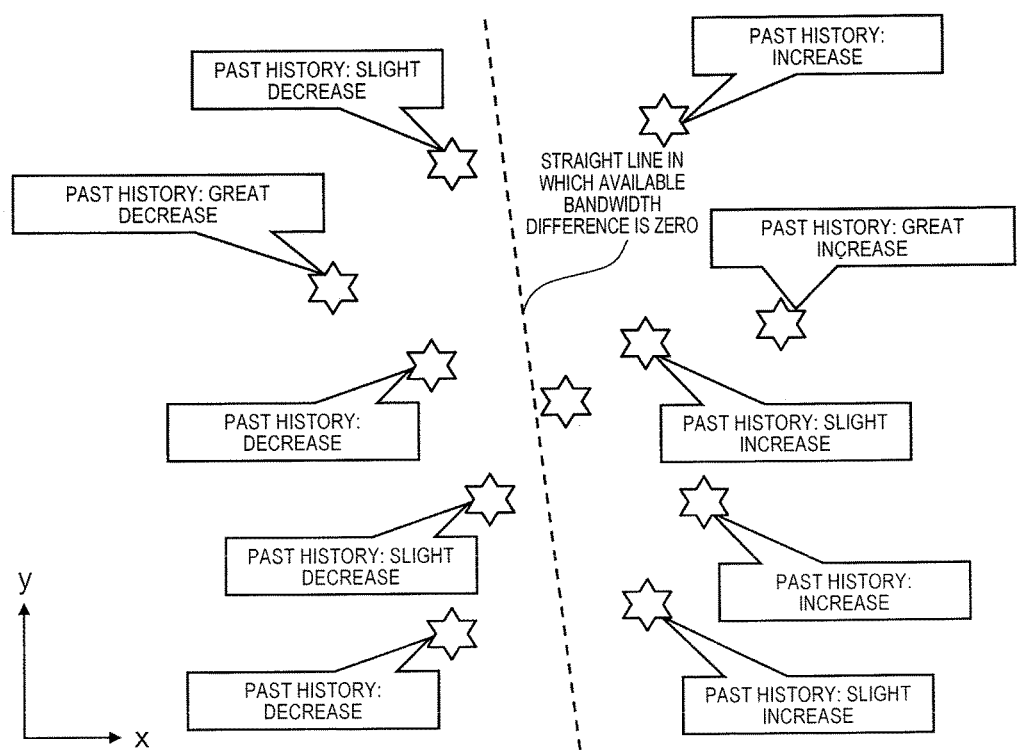
FIG. 11 is a conceptual diagram showing a state in which a straight line which is a set of positions in which an available bandwidth difference is zero is acquired as a result of a statistical process on the history information of the handover.

Processor 40 may extract the history information of the available bandwidth difference which is the difference between the first available bandwidth before the conduct of the handover and the second available bandwidth after the conduct of the handover from the extracted history information items. As shown in FIG. 11, processor 40 performs a predetermined statistical process on the history information, and determines a set of positions (positions in which there is no change before and after the handover) in which the available bandwidth difference is zero. In the present example, processor 40 performs a first-order approximation (using a method of least squares) as a statistical process on a two-dimensional plane of an area where mobile wireless terminal 100 moves, and acquires a straight line which is a set of positions in which the available bandwidth difference is zero.

Available bandwidth $w_{1i}$ (first available bandwidth) before the conduct of the handover and available bandwidth (second available bandwidth) $w_{2i}$ after the conduct of the handover which are estimated by processor 40 are associated with position measurement data $(x_i, y_i)$ indicating a position in xy two-dimensional coordinates measured by position measurement sensor 50. Here, processor 40 expresses a change amount $d_{wi}$ ($=w_{2i}-w_{1i}$; a positive value at the time of increase and a negative value at the time of decrease) which is equivalent to a difference between available bandwidth $w_{1i}$ and available bandwidth $w_{2i}$ by a function of x and y of $d_{wi}=f(x_i, y_i)$, and performs the first-order approximate on the function of $f(x_i, y_i)$. As a result, a straight line in which $f(x_i, y_i)=0$ is acquired. Each point of FIG. 11 represents the increase or decrease relationship between available bandwidth $w_{1i}$ and available bandwidth $w_{2i}$. The straight line which is the set of positions in which the available bandwidth difference is zero is a criterion for determining the handover area which is an area where the handover is conducted.

Figure 12:
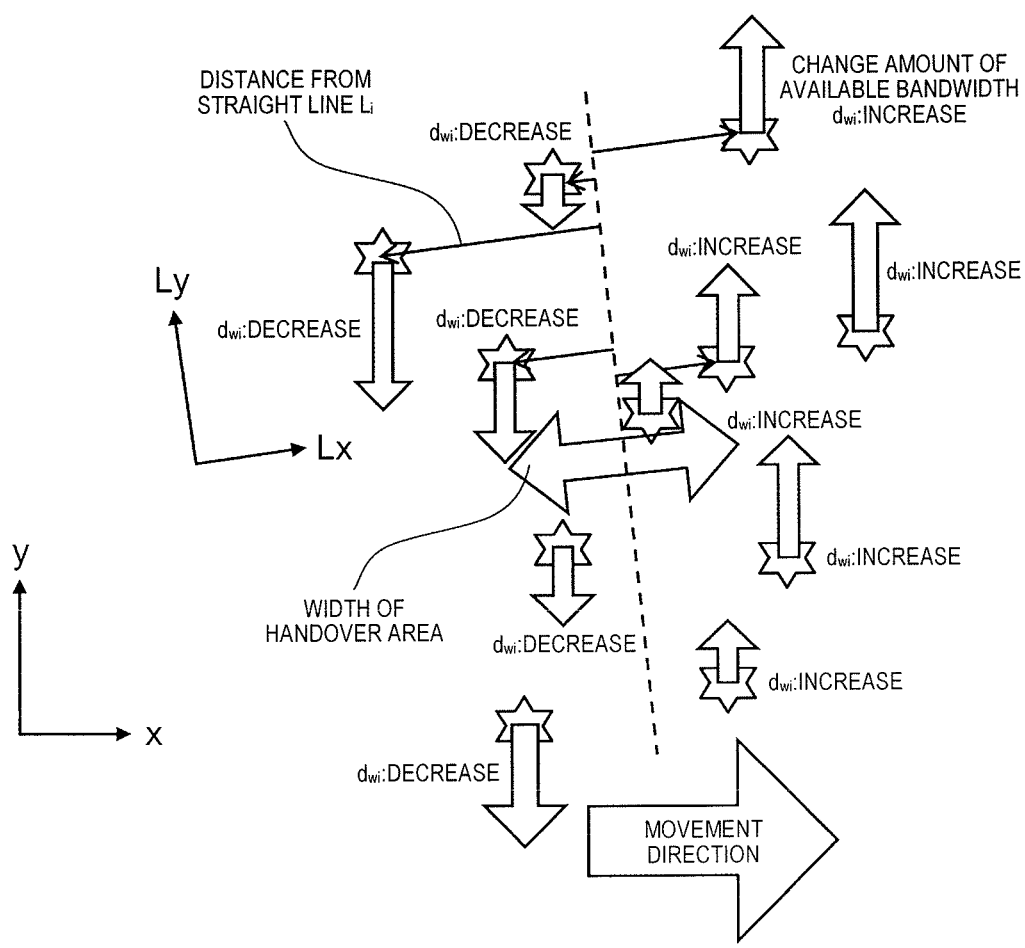
FIG. 12 is a conceptual diagram showing a state in which a width of the handover area is calculated from variation of the history information of the handover or a movement speed.

Subsequently, processor 40 calculates a width of the handover area from variance of the handover history information or a movement speed, as shown in FIG. 12. Here, the width of the handover area refers to a length in a direction perpendicular to the straight line acquired in FIG. 11. Initially, processor 40 uses distance $L_{xi}$ of each point from the straight line in a direction perpendicular to the straight line and change amount $d_{wi}$ of the available bandwidth calculated in FIG. 11, and performs approximation of the distance from the straight line and the change amount of the available bandwidth by using a linear expression $d=k \times L_x$ (since $L_x=0$ and $d=0$, there is no constant term).

Since there is short-time variation (cause of error) due to fading (interference of a plurality of reflected waves) of the radio waves of the wireless communication, processor 40 calculates the width of the handover area with which the variation of the available bandwidth is estimated to be included in a predetermined range (for example, ±30%) before and after the handover by using the first-order approximation expression. In a case where the calculated width is smaller than the movement speed of mobile wireless terminal 100, since there is a concern that this terminal passes through during the movement and the handover fails, processor 40 calculates a value acquired by multiplying the movement speed by a predetermined time (about two times a time when the handover is periodically determined), as a minimum width of the handover area. That is, processor 40 determines the width of the handover area based on a range from the straight line as the set of positions to the position in which the available bandwidth difference is included in the predetermined value.

Figure 13:
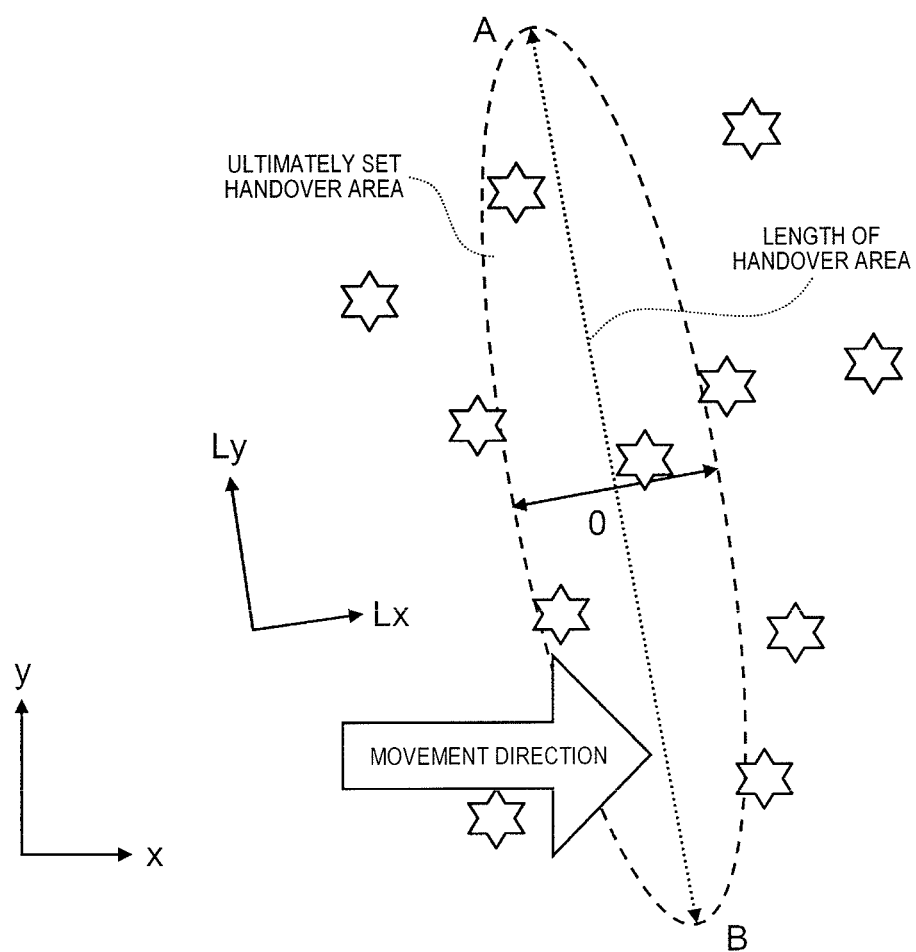
FIG. 13 is a conceptual diagram showing a state in which a length of the handover area is determined based on two positions (two boundary points) that satisfy a minimum available bandwidth required by a communication application used by the mobile wireless terminal.

Subsequently, processor 40 calculates the length of handover area as shown in FIG. 13. Here, the length of the handover area refers to a length along the straight line. Processor 40 calculates values of coefficients a and b, and constant c by giving virtual origin 0 in the straight line, using position $L_{yi}$ in the same direction as the straight line and available bandwidth $w_{1i}$ (first available bandwidth) and available bandwidth (second available bandwidth) $w_{2i}$ for access points AP1 and AP2 before and after the handover, and performing approximation distances from the virtual origin (virtual x axis) and available bandwidths using a secondary expression of $W_1 = a \times L_y^2 + b \times L_x + c$ and $W_2 = a \times L_y^2 - b \times L_x + c$ ($W_1$ is an estimation value of the first available bandwidth and $W_2$ is an estimation value of the second available bandwidth). Processor 40 determines the length of the handover area based on two positions (two boundary points) A and B that satisfy a minimum available bandwidth required by a communication application used by mobile wireless terminal 100 in the straight line ($L_x=0$) by the second-order approximation expression. The handover area is set by the above-described process.

Figure 14:
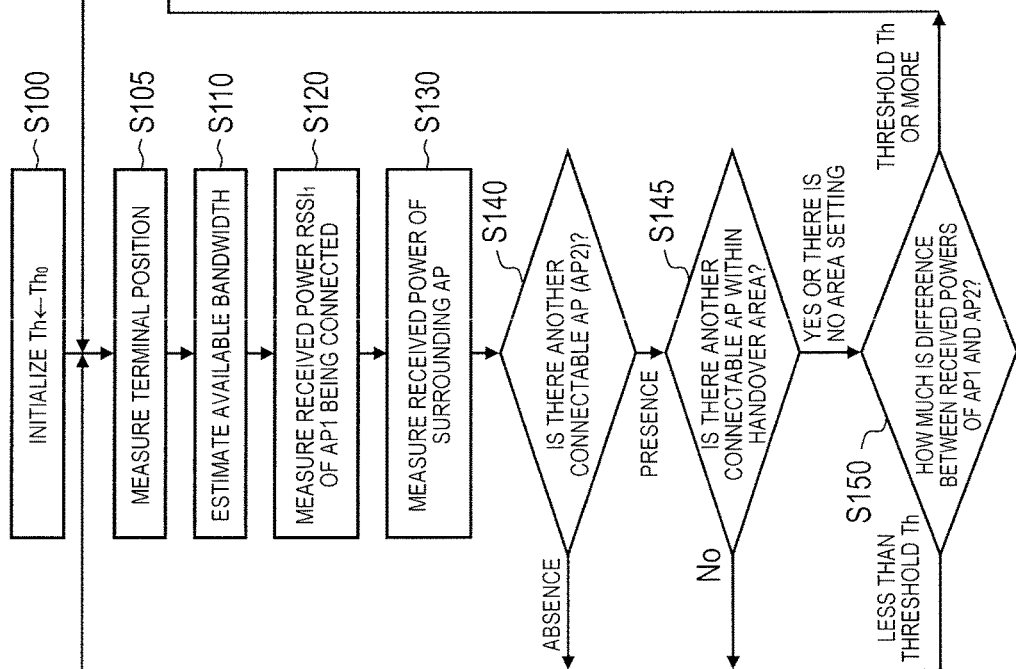
FIG. 14 is a flowchart showing a procedure of controlling the conduct of the handover conducted by a mobile wireless terminal of Exemplary Embodiment 3.

FIG. 14 is a flowchart showing a procedure of controlling the conduct of the handover conducted by mobile wireless terminal 100 of the present exemplary embodiment shown in FIGS. 10 to 13. The procedure from step S100 to step S170 is the same as that of the flowchart shown in FIG. 9.

Processor 40 estimates the available bandwidth (step S180), and extracts the temporally close and spatially close history information items from the handover history information items (step S240; FIG. 10). Processor 40 acquires a straight line which is a set of points as positions (the available bandwidth difference is zero) in which the available bandwidths are equal by the approximation calculation using the statistical process (step S250; FIG. 11). Processor 40 calculates the width of the handover area from the variance and the movement speed (step S260; FIG. 12). Processor 40 calculates the length (two boundary points) of the available bandwidth in the straight line in the approximation calculation (step S270; FIG. 13). Ultimately, processor 40 sets the handover area from the width and the length (step S280; FIG. 13). Here, the process is ended in a case where a sufficient number of history information items are not accumulated in step S240, and processor 40 enters a mode in which operations subsequent to step S105 are repeated again.

As stated above, processor 40 sets the handover area by using the history information of the available bandwidth difference which is the difference between the first available bandwidth and the second available bandwidth. As a result, processor 40 can control the position in which the handover is conducted to be a more appropriate position, and it is possible to increase a possibility that smoother handover will be conducted. Although it has been described in the present example that memory 30 stores the history information, since information amount becomes large, another storage device such as a server on a network may store the history information, and mobile wireless terminal 100 may access the storage device when necessary, and may extract the history information.

Mobile wireless terminal 100 of the present exemplary embodiment includes antenna 10 capable of receiving the radio wave from access point AP, wireless communication interface 20 that measures the received power of the radio wave received by antenna 10, processor 40, and memory 30. In cooperation with memory 30, processor 40 stores a first received power from first access point AP1 and a second received power from the second access point AP2 in memory 30, and conducts the handover from first access point AP1 to second access point AP2 in a case where a difference acquired by subtracting the first received power from the second received power is equal to or greater than predetermined threshold Th. Processor 40 estimates the first available bandwidth before the conduct of the handover, and stores the estimated bandwidth in memory 30. The processor estimates the second available bandwidth after the conduct of the handover, and stores the estimated bandwidth in memory 30. The processor controls a position in which the handover of mobile wireless terminal 100 being moved is conducted based on an available bandwidth difference between the first available bandwidth and the second available bandwidth.

Accordingly, mobile wireless terminal 100 controls a timing when the handover is conducted based on the available bandwidth difference which is the difference between the first available bandwidth and the second available bandwidth. As a result, mobile wireless terminal 100 can more appropriately control the timing when the handover is conducted, and can increase a possibility that smoother handover will be conducted.

In mobile wireless terminal 100 of the present exemplary embodiment, processor 40 decreases predetermined threshold Th in a case where the second available bandwidth is greater than the first available bandwidth, and increases predetermined threshold Th in a case where the second available bandwidth is smaller than the first available bandwidth.

Accordingly, mobile wireless terminal 100 can appropriately control the timing and position in which the handover is easily conducted, and can increase the possibility that smoother handover will be conducted.

Mobile wireless terminal 100 of the present exemplary embodiment further includes position measurement sensor 50 that measures a position. Processor 40 stores a first position of mobile wireless terminal 100 at the time of the conduct of the first handover, which is measured by position measurement sensor 50, in memory 30, and stores a second position which is closer to first access point AP1 than the first position and in which second handover is conducted in memory 30 in a case where the second available bandwidth is greater than the first available bandwidth. Processor 40 stores a third position which is closer to second access point AP2 than the first position and in which third handover is conducted in memory 30 in a case where the second available bandwidth is smaller than the first available bandwidth.

Accordingly, mobile wireless terminal 100 can control the position in which the handover is conducted to be a more appropriate position based on the available bandwidth difference which is the difference between the first available bandwidth and the second available bandwidth, and can increase the possibility that smoother handover will be conducted.

In mobile wireless terminal 100 of the present exemplary embodiment, processor 40 extracts the position at the time of the conduct of the handover and the history information of the available bandwidth difference at the corresponding position which are stored in memory 30, and performs a predetermined statistical process on the history information. The processor determines a set of positions in which the available bandwidth difference is zero, and determines the handover area which is an area where the handover is conducted based on the set.

Accordingly, since mobile wireless terminal 100 determines the handover area by referring to the past history information of the available bandwidth difference, it is possible to increase the possibility when smoother handover will be conducted.

In mobile wireless terminal 100 of the present exemplary embodiment, processor 40 extracts only the history information items which are within a predetermined time from a current time and are within a predetermined range from the current position, which are stored in memory 30, from memory 30.

Accordingly, since mobile wireless terminal 100 determines the handover area by referring to the history information items close to the current time and the current position, it is possible to increase the possibility when smoother handover will be conducted.

In mobile wireless terminal 100 of the present exemplary embodiment, processor 40 determines the width of the handover area based on the range from the set to the position in which the available bandwidth difference is included in the predetermined value.

Accordingly, since mobile wireless terminal 100 determines the handover area by referring to the available bandwidth difference having a predetermined range value, it is possible to increase the possibility when smoother handover will be conducted.

In mobile wireless terminal 100 of the present exemplary embodiment, the length of the handover area is determined on the set based on two positions that satisfy the minimum available bandwidth required by the communication application used by mobile wireless terminal.

Accordingly, since mobile wireless terminal 100 determines the handover area by referring to the minimum available bandwidth required by the communication application, it is possible to increase the possibility when smoother handover will be conducted.

Although the exemplary embodiments of the mobile wireless terminal according to the present disclosure have been described with reference to the drawings, the present disclosure is not limited thereto. It is apparent to those skilled in the art that various change examples, modification examples, substitution examples, addition examples, removal examples, and equivalent examples may be derived without departing from the scope described in claims, and it is understood that these examples are included in the technical scope of the present disclosure.

INDUSTRIAL APPLICABILITY

The present disclosure is useful as a mobile wireless terminal capable of conducting appropriate handover.

REFERENCE MARKS IN THE DRAWINGS 10 antenna
20 wireless communication interface
30 memory
40 processor
50 position measurement sensor
100 mobile wireless terminal
AP1 first access point (first radio base station)
AP2 second access point (second radio base station)

The invention claimed is:

1. A mobile wireless terminal, comprising:
an antenna that receives a radio wave from an access point;
a wireless communication interface that measures a received power of the radio wave received by the antenna;
a processor; and
a memory,
wherein the processor in cooperation with the memory is configured to
store a first received power from a first access point and a second received power from a second access point in the memory,
conduct handover from the first access point to the second access point in a case where a difference acquired by subtracting the first received power from the second received power is equal to or greater than a predetermined threshold Th,
estimate a first available bandwidth before the conduct of the handover, and store the estimated first available bandwidth in the memory,
estimate a second available bandwidth after the conduct of the handover, and store the estimated second available bandwidth in the memory,
control a timing when the handover of the mobile wireless terminal being moved is conducted based on an available bandwidth difference between the first available bandwidth and the second available bandwidth,
decrease the predetermined threshold Th in a case where the second available bandwidth is greater than the first available bandwidth, and
increase the predetermined threshold Th in a case where the second available bandwidth is smaller than the first available bandwidth.

2. A mobile wireless terminal, comprising:
an antenna that receives a radio wave from an access point;
a wireless communication interface that measures a received power of the radio wave received by the antenna;
a processor;
a memory; and
a position measurement sensor that measures a position,
wherein the processor in cooperation with the memory is configured to
store a first received power from a first access point and a second received power from a second access point in the memory,
conduct handover from the first access point to the second access point in a case where a difference acquired by subtracting the first received power from the second received power is equal to or greater than a predetermined threshold Th,
estimate a first available bandwidth before the conduct of the handover, and store the estimated first available bandwidth in the memory,
estimate a second available bandwidth after the conduct of the handover, and store the estimated second available bandwidth in the memory,
control a timing when the handover of the mobile wireless terminal being moved is conducted based on an available bandwidth difference between the first available bandwidth and the second available bandwidth,
store a first position of the mobile wireless terminal at the time of conduct of first handover, which is measured by the position measurement sensor, in the memory,
store a second position, which is closer to the first access point than the first position and in which second handover is conducted in the memory, in a case where the second available bandwidth is greater than the first available bandwidth, and
store a third position, which is closer to the second access point than the first position and in which third handover is conducted in the memory, in a case where the second available bandwidth is smaller than the first available bandwidth.

3. The mobile wireless terminal of claim 2, wherein the processor is configured to
perform a predetermined statistical process on a position at the time of the conduct of the handover and history information of the available bandwidth difference at the position, and determine a set of positions in which the available bandwidth difference is zero, and determine a handover area which is an area where the handover is conducted based on the set.

4. The mobile wireless terminal of claim 3,
wherein the processor is configured to use only history information that is within a predetermined time from a current time and is within a predetermined range from a current position.

5. The mobile wireless terminal of claim 3,
wherein the processor is configured to determine a width of the handover area based on a range from the set to a position in which the available bandwidth difference is included in a predetermined value.

6. The mobile wireless terminal of claim 3,
wherein the processor is configured to determine a length of the handover area on the set based on two positions that satisfy a minimum available bandwidth required by a communication application used by the mobile wireless terminal.

7. A control method of causing a processor to control a timing when handover of a mobile wireless terminal is conducted, the method comprising:

causing the processor in cooperation with a memory to store a first received power from a first access point and a second received power from a second access point in the memory;

causing the processor in cooperation with the memory to conduct handover from the first access point to the second access point in a case where a difference acquired by subtracting the first received power from the second received power is equal to or greater than a predetermined threshold Th;

causing the processor in cooperation with the memory to estimate a first available bandwidth before the conduct of the handover and to store the estimated first available bandwidth in the memory;

causing the processor in cooperation with the memory to estimate a second available bandwidth after the conduct of the handover and to store the estimated second available bandwidth in the memory;

causing the processor in cooperation with the memory to control a timing when handover of the mobile wireless terminal being moved is conducted based on an available bandwidth difference between the first available bandwidth and the second available bandwidth;

causing the processor in cooperation with the memory to decrease the predetermined threshold Th in a case where the second available bandwidth is greater than the first available bandwidth; and causing the processor in cooperation with the memory to increase the predetermined threshold Th in a case where the second available bandwidth is smaller than the first available bandwidth.

8. A control method of causing a processor to control a timing when handover of a mobile wireless terminal is conducted, the method comprising:

causing the processor in cooperation with a memory to store a first received power from a first access point and a second received power from a second access point in the memory;

causing the processor in cooperation with the memory to conduct handover from the first access point to the second access point in a case where a difference acquired by subtracting the first received power from the second received power is equal to or greater than a predetermined threshold Th;

causing the processor in cooperation with the memory to estimate a first available bandwidth before the conduct of the handover and to store the estimated first available bandwidth in the memory;

causing the processor in cooperation with the memory to estimate a second available bandwidth after the conduct of the handover and to store the estimated second available bandwidth in the memory;

causing the processor in cooperation with the memory to control a timing when handover of the mobile wireless terminal being moved is conducted based on an available bandwidth difference between the first available bandwidth and the second available bandwidth;

causing the processor in cooperation with the memory to store a first position of the mobile wireless terminal at the time of conduct of first handover, which is measured by a position measurement sensor, in the memory;

causing the processor in cooperation with the memory to store a second position which is closer to the first access point than the first position and in which second handover is conducted in the memory in a case where the second available bandwidth is greater than the first available bandwidth; and causing the processor in cooperation with the memory to store a third position which is closer to the second access point than the first position and in which third handover is conducted in the memory in a case where the second available bandwidth is smaller than the first available bandwidth.

9. The control method of claim 8, further comprising:
causing the processor in cooperation with the memory to perform a predetermined statistical process on a position at the time of the conduct of the handover and history information of the available bandwidth difference at the position, and to determine a set of positions in which the available bandwidth difference is zero; and causing the processor in cooperation with the memory to determine a handover area which is an area where the handover is conducted based on the set.

10. The control method of claim 9, further comprising:
causing the processor in cooperation with the memory to use only history information which is within a predetermined time from a current time and is within a predetermined range from a current position.

11. The control method of claim 9, further comprising;
causing the processor in cooperation with the memory to determine a width of the handover area based on a range from the set to a position in which the available bandwidth difference is included in a predetermined value.

12. The control method of claim 9, further comprising;
causing the processor in cooperation with the memory to determine a length of the handover area on the set based on two positions that satisfy a minimum available bandwidth required by a communication application used by the mobile wireless terminal.

* * * * *